(12) United States Patent
Bryce et al.

(10) Patent No.: US 8,135,610 B1
(45) Date of Patent: Mar. 13, 2012

(54) SYSTEM AND METHOD FOR COLLECTING AND PROCESSING REAL-TIME EVENTS IN A HETEROGENEOUS SYSTEM ENVIRONMENT

(75) Inventors: Daniel John Bryce, Altadena, CA (US); Walter Lee Schaedle, Jr., Kennesaw, GA (US); Randall Leonard Sterba, Valencia, CA (US); Randal Cameron Sue, Cerritos, CA (US); Todd Christopher Williams, Thousand Oaks, CA (US)

(73) Assignee: Answer Financial, Inc., Encino, CA (US)

( * ) Notice: Subject to any disclaimer, the term of this patent is extended or adjusted under 35 U.S.C. 154(b) by 1157 days.

(21) Appl. No.: 11/871,785

(22) Filed: Oct. 12, 2007

Related U.S. Application Data (60) Provisional application No. 60/853,566, filed on Oct. 23, 2006.

(51) Int. Cl.
  *G06F 17/00* (2006.01)
(52) U.S. Cl. ...................................................... 705/7.41
(58) Field of Classification Search .................. 705/7.41
  See application file for complete search history.

(56) References Cited

U.S. PATENT DOCUMENTS

| | | | |
|---|---|---|---|
| 6,754,181 B1 | 6/2004 | Elliott et al. | |
| 6,856,983 B2 | 2/2005 | Cox et al. | |
| 7,099,932 B1 | 8/2006 | Frenkel et al. | |
| 7,568,025 B2 * | 7/2009 | Vasudeva | 709/224 |
| 2002/0049608 A1 | 4/2002 | Hartsell et al. | |
| 2002/0112196 A1 * | 8/2002 | Datta et al. | 714/4 |
| 2004/0015579 A1 | 1/2004 | Cooper et al. | |
| 2004/0261116 A1 | 12/2004 | Mckeown et al. | |
| 2004/0267691 A1 * | 12/2004 | Vasudeva | 707/1 |
| 2006/0142011 A1 | 6/2006 | Kallio | |
| 2006/0179064 A1 | 8/2006 | Paz et al. | |

\* cited by examiner

*Primary Examiner* — Thomas Dixon
(74) *Attorney, Agent, or Firm* — Mark J. Danielson; Pillsbury Winthrop Shaw Pittman LLP (57) ABSTRACT

A method and process according to the invention supports at least two distinct activities. A first activity relates to system analysis—the ability to collect, measure, track, monitor and report on health and performance of individual systems within a complex environment of highly interdependent and/or loosely coupled systems. Another activity relates to customer experience tracking—the ability to capture and track an entire customer's experience as that person interacts with multiple technologies such as a web site, telephony system and a set of agent tools. According some aspects, a system according to the invention provides the backbone for monitoring production systems and for enabling integrated, real-time reporting of a company (e.g. insurance agency) website, telephony system and agent desktop suite. In one example, the system uses specialized probes embedded in key processes to collect extensive, targeted information in a non-intrusive manner and to relay that information back to a centralized service for processing and further analysis. The key pieces of captured information are known as checkpoints.

25 Claims, 5 Drawing Sheets

```
<SequenceID>
    <SequenceNumber>1234567890123456789</SequenceNumber>
    <SessionNumber>AB16DE129</SessionNumber>
    <ProbeIdentifier>auto-qs@dw01</ProbeIdentifier>
    <CheckpointType>Quote Start</CheckpointType>
    <TimeStamp>2006-10-16 12:22.361</TimeStamp>
</SequenceID>
```

SYSTEM AND METHOD FOR COLLECTING AND PROCESSING REAL-TIME EVENTS IN A HETEROGENEOUS SYSTEM ENVIRONMENT

CROSS-REFERENCE TO RELATED APPLICATIONS

The present application is based on, and claims priority from, U.S. Provisional Patent Appln. No. 60/853,566, filed Oct. 23, 2006, the contents of which are incorporated herein by reference in their entirety.

FIELD OF THE INVENTION

The present invention relates to monitoring real-time events in a system containing a plurality of heterogeneous services and more particularly to collecting and tracking events related to providing a customer service using one or more heterogeneous systems that interact with the customer and/or provide assistance in performing a service for the customer.

BACKGROUND OF THE INVENTION

Real-time monitoring of a collection of heterogeneous systems operating within a production environment, and doing so in such a manner that does not impact the behaviors of those systems, has, and continues to be, a challenge. Some traditional reporting systems require expensive, time-delayed processing of log files. Other systems provide real-time reporting but can only offer limited visibility into the internal processes. In short, while several systems and techniques in the prior art address some aspects of reporting, each has its limitations.

One attempted technique is Logfile Analysis. This typically involves post-processing standard transaction files produced by a web server to generate reports. The logfiles reside on the company's servers. This method worked well in the early days of the web when the primary statistic was a hit (an HTTP get request). In order to more accurately measure human interaction page views (a single count for a page that may have required several HTTP requests) and visits (sessions) emerged as more meaningful analytics.

Logfile analytics packages were extended to consolidate requests into page views and pages into higher level groupings (e.g., shopping pages, checkout pages, purchase pages and support pages).

Some problems with logfile analysis include the following. A visit to a previously displayed page may result in the page being retrieved from the client browser's cache—The page view would not appear in the web log and therefore the user's path through the site would not be accurately reflected. Only limited information can be captured—This includes basic characteristics (e.g., browser type, client IP and cookies) and the requested URL. Important information that may be contained in the text of the page (e.g., product selected, user zipcode or error message) can not be captured—Inconsistencies are to be expected as the logfiles may be spread across several servers. The files from the multiple servers must be collected and combined together for reporting. During this process one may expect slight differences—For example, it may be difficult to precisely reconstruct a user's path through a site because the clock settings on the servers may be slightly different. This approach does not lend itself to real-time reporting—Logfiles are typically processed as batch jobs during off-hours.

Another prior art technique is Page Tagging. Deficiencies with logfile analysis, along with the desire to perform analytics as an outsourced offering, led to a page tagging approach. Page tagging involves dropping small pieces of code on each page. This code, typically written in JavaScript, runs each time a page is loaded and therefore avoids the problems with caching. With this approach it is easier to add additional information, including details displayed on the page, which will be collected by the reporting server.

Some potential problems with page tagging include the following: Page tagging could be disabled by the client's browser (such as turning off JavaScript); Page tagging only records successful pages, it can not record error conditions; Page tagging reporting will measure page displays or refreshes, it does not capture the underlying event (for example, a page may be redisplayed as a result of hitting the browser back button or the browser refresh); Page tagging only works in environments that support HTML; and Reports could be manipulated by someone simulating the functionality of the JavaScript code.

Web Bug-based systems represent one specialization of prior art page-tagging systems. Its use is sufficiently broad that it merits discussion. A web bug is an invisible object (usually a single pixel gif) on a page. Alternate names include web beacon, tracking bug, pixel tag and clear .gif. When the browser renders the page it performs an HTTP get for the image, thus recording the event to the reporting server.

Web bug-based systems are limited in several ways including the following: Limited information can be passed to a reporting system such as the URL of the page containing the Web Bug and the URL of the Web Bug itself—Since a Web Bug is requested as a standard HTTP request, all typical HTTP request data (e.g., client IP address, client browser type and any cookies for the domain of the Web Bug) will also be available; Since the Web Bug URL is the only mechanism to relay information from the server to the reporting system, embedding multiple data elements in this one string can be difficult to manage and the amount of data is limited by the size of the URL; There is no guarantee that the client browser will ever request the Web Bug URL; Security features and user preferences (such as don't allow 3rd party images or don't load images) can effectively defeat this reporting; Web Bug reporting will measure page displays or refreshes, it does not capture the underlying event (for example, a page may be redisplayed as a result of hitting the browser back button); Reports can be easily manipulated by a process that simply generates HTTP gets based on the form of the URL which is clearly visible in the source of any page; This mechanism is limited in that it can only work on browser-based applications using HTTP as the communication vehicle.

Another method emerged that relies on intercepting or sniffing network traffic (e.g. stream interceptors). It typically includes a device that sits between the client browser and the company server. This device could be trained to identify and capture specific types of events in the traffic stream. A major advantage of such a system is that it resides on the company side and is not impacted by client browser settings. Another advantage is that it does not require modifications to any existing code in order to generate basic reports. Additionally, this method can form the foundation for a more completed screen capture and replay system.

However, some problems with stream interception systems include the following: Without modifying the system (and perhaps adding tracers) it could be difficult to identify the events of interest; As with page tagging, only successful events will be recorded; The level of information captured is limited to that included on the displayed pages; Recording the secure portions of the site will require special machine reconfiguration or separate encryption/decryption hardware; If the entire stream (or a large portion of it) is captured, the amount of information could quickly grow to an unmanageable size.

All of the above systems focus on the user experience side of reporting. That is, they rely on analysis of HTTP requests and responses to count page displays and visits at an aggregate level or to perform path analysis at a more granular level. None of these systems provide measurements on the health of the underlying system. This has been the domain of system monitoring tools.

Traditionally, system monitoring tools report on key parameters such as CPU utilization, network utilization, memory usage, page faults and disk transfers. All of these provide some measure of the responsiveness of a system but impact of these variables on a user experience is hard to quantify. Many of these tools require substantial resources so in the process of collecting observations on system performance the tool is itself changing system performance.

The most general reporting mechanism is placement of print statements in specific areas of a system. However, its effectiveness is limited since creating the data is only the first step in the process. The data must be collected and aggregated. This could be challenging in an environment in which applications may be spread across several machines.

As shown above, the current approaches have several limitations including the following: Reliance on a specific technologies such as HTTP or proprietary system monitoring protocols; Limitation on the amount and type of information collected; Vulnerabilities in generating and managing data which leads to potential inaccuracies; Difficulty in collecting the data and mining through it to pull out meaningful information; Lack of uniform methods for handling system health and customer experience information Some prior art references that relate to the above and other current approaches include U.S. Pat. No. 6,856,983, U.S. Pat. No. 7,099,932, U.S. Pat. No. 6,754,181, U.S. Patent Pub. No. 20040015579, U.S. Patent Pub. No. 20040261116, U.S. Patent Pub. No. 20060179064, U.S. Patent Pub. No. 20060142011, and U.S. Patent Pub. No. 20020049608. However, a need remains for a system and method that can overcome the above-identified limitations and problems, among others.

SUMMARY OF THE INVENTION

A method and process according to the invention supports at least two distinct activities. A first activity relates to system analysis—the ability to collect, measure, track, monitor and report on health and performance of individual systems within a complex environment of highly interdependent and/or loosely coupled systems. Another activity relates to customer experience tracking—the ability to capture and track an entire customer's experience as that person interacts with multiple technologies such as a web site, telephony system and a set of agent tools. A system according to the invention provides the backbone for monitoring production systems and for enabling integrated, real-time reporting of a company (e.g. insurance agency) website, telephony system and agent desktop suite. In one example, the system uses specialized probes embedded in key processes to collect extensive, targeted information in a non-intrusive manner and to relay that information back to a centralized service for processing and further analysis. The key pieces of captured information are known as checkpoints.

In one example embodiment, a sequence generating service creates and tracks unique identification tags for each checkpoint. Fields embedded in these tags include a unique sequence number, a session identifier, a probe identifier, a checkpoint type and a timestamp. All checkpoints are stamped so that they can be properly reassembled by a downstream service. Furthermore, in the event that a checkpoint is discovered as missing, a reconstructor service can issue a request to the probe to resend that checkpoint. If this request is not successful, this reconstructor will recreate a checkpoint based on other information such as prior and subsequent checkpoints in the particular interaction stream. A set of services collect the base level checkpoint, augment the base data with additional details and store it in de-normalized tables. Miners filter through this information in real-time looking for problematic patterns and, when discovered, trigger alerts that may be addressed to a production monitoring team or may be directed to specific components that respond by modifying the system configuration automatically. A librarian service acts as the central repository and access control component. It includes tools and processes to organize the data into staging and archive reporting tables, to control internal and external access rights and to format the data appropriately for the targeted tool.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, the present invention includes components to gather, collect and analyze events in a system comprising a plurality of heterogeneous systems and processes, certain or all of which can be used to provide a customer service. During a collection and cleansing process, error correction can be performed to ensure that an entire customer experience is captured or inferred in the event data. In some embodiments, data can be organized for fast retrieval with access controlled through one component.

For illustrative purposes the invention will now be described in connection with FIG. 1, which illustrates one example application for an insurance agency 110 having both a telephone call center and a network (e.g. Internet and/or WWW) presence. In this example, a customer 102 may shop online as a self-directed web consumer and/or at some point may choose to interact with an agent 104, or with a PBX/computer telephony (CTI) system 106, via telephone. The web consumer 102 and agent 104, further communicate via a network 108 with agency 110. PBX/CTI system 106 can include, or communicate with, an IVR so customer 102 can interact directly with PBX/CTI 106 and/or be switched to an agent 104, for example after providing responses to a number of prompts in an IVR menu. While shown separately from agency 110 for purposes of illustration, it should be noted that PBX/CTI 106 is typically located with and/or included in agency 110.

In one example implementation, PBX/CTI 106 is included in a Definity G3R system from Avaya. Such a system can support over 200 simultaneous phone calls handled by up to 300 concurrently connected call handlers such as agent 104. This example private branch exchange (PBX) has an automatic call distribution (ACD) system for call routing, includes a bridge to an interactive voice response (IVR) menu selection system such as an Avaya Conversant IVR/VRU, and provides interfaces to an Avaya CT CTI system and call record reporting (CMS) systems. Accordingly, while system 106 is described primarily with respect to its PBX and CTI functionality for supporting computer-supported telephony sessions with customers 102, it preferably further includes IVR, VRU, ACD and CMS functionality for supporting and handling customer calls. However, it should be noted that this is merely one possible implementation, and that the invention can be practiced with many other different types and brands of call center systems, having any number of CTI systems, ACD systems, IVR systems, etc.

In general, communications with customer 102 via PBX/CTI 106 and network 108 represent consumer interactions, which are used by agency 110 to guide a process of selecting and generating a quote for an insurance product (e.g. home, auto, life, health, etc.) desired by the consumer. Within agency 110, a number of different processes 112-1 to 112-n interact with desktop applications of agents 104 and applications in PBX/CTI 106 via internal networks (e.g. Ethernet, not shown), for example, as well as with each other and with external parties such as credit agencies 114 (e.g. for credit reports), government agencies 116 (e.g. for driving records), and insurance carriers 118 (e.g. for quotes and policies) via external networks such as the Internet.

Processes 112 represent the various functionalities and platforms that are used by agency 110 to provide and support customer service operations. Processes 112 can include web/HTTP servers (e.g. for supporting an agency website accessible by customers 102 via the Internet) and applications servers using Microsoft C# and .NET, web services using Microsoft .NET, and databases using SQL Server, running on one or more different server computers or other computing platforms communicating via an Ethernet. Processes 112 can further include software components operating in or communicating with PBX/CTI 106 such as telephony programming applications, CTI applications, CMS applications, etc. Various implementation details of processes 112 will become more fully apparent from the descriptions below.

System 100 collects and processes information (i.e. checkpoints) about real-time events corresponding to consumer 102 interactions with a web site, consumer 102 interactions with a telephony system 106 and agent 104 interactions with system tools, typically through corresponding events originating from processes 112. System 100 can process these checkpoints and store them in a database 120, as well as use them to generate alerts 122, reports 124 and charts 126. Although not shown in FIG. 1, it should be apparent that system 100 can include archiving capabilities to provide permanent records for later retrieval and backup. Moreover, while system 100 is shown separately from agency 110 in FIG. 1, it is likely that system 100 is located within or in close proximity with agency 110.

As will be described in more detail below, system 100 in example embodiments includes a sequence generating service that creates and tracks unique identification tags for each received checkpoint. All checkpoints are time-stamped so that they can be reassembled in proper time sequence. System 100 can further include a set of services to store checkpoints as de-normalized tables in database 120, as well as filter through the information in real-time looking for problematic patterns which, when discovered, are used by system 100 to trigger alerts 122 that may be addressed to a production monitoring team or may be directed to specific components that respond by modifying the system configuration automatically. System 100 can also include a librarian service that includes tools and processes to organize the data into staging and archive reporting tables 124 and charts 126, and to control internal and external access rights to the data.

In one example embodiment, system 100 can be implemented with one or more application servers using C# and .NET servers coupled to agency 110 via an internal network such as an Ethernet (not shown), as well as associated databases and other types of services and applications. Example implementations of such servers and functionality will become apparent to those skilled in the art based on the descriptions herein.

According to aspects of the invention, checkpoints can be collected from different types of systems and in various different ways, as will be described in more detail below. According to further aspects, checkpoints relate to all aspects of the effectiveness and ability of the agency to provide service to customers. For example, checkpoints can track steps in process of providing an insurance product. Checkpoints can also relate to the functional health of systems used to provide such services.

It should be noted that while certain components are shown communicating via a network, that many variations in the number and selection of components communicating via a network are possible. Moreover, while certain or all components may communicate via a network, not all such components in FIG. 1 need be remotely located or grouped/separated as shown. For example, agency 110 can be a call center that is provided by one or more carriers 118, and partially or fully located on the same premises as systems of carrier 118. Alternatively, agency 110 can be accessed by customers 102 via the Internet who intend to communicate with one of carriers 118, but who are redirected to agency 110, perhaps transparently to the customer. Those skilled in the art will understand various other alternative implementations, groupings and associations.

Figure 1:
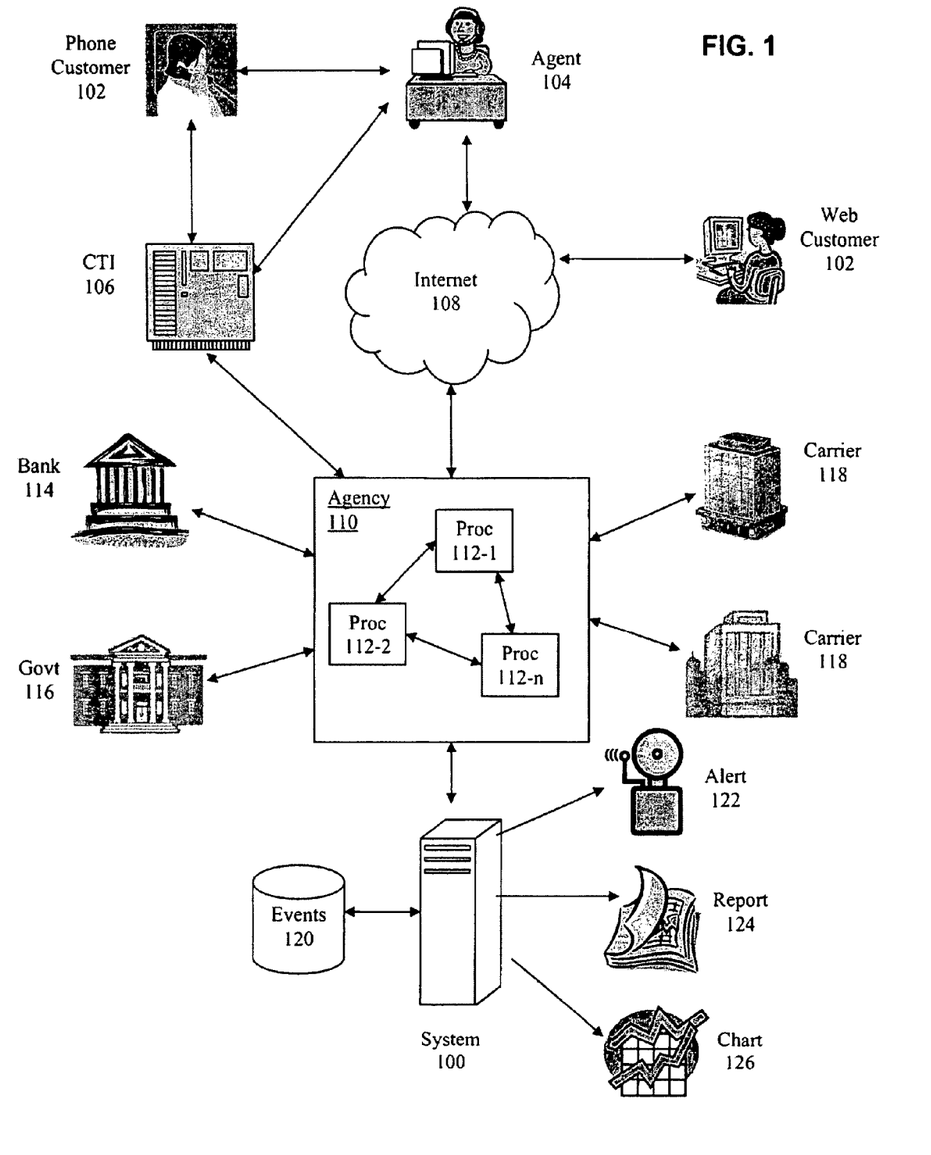
FIG. 1 is a block diagram illustrating one example implementation of a system according to the invention in an insurance call center/website environment.

It should be further noted that an insurance agency can include many additional components not shown in FIG. 1, such as CRM applications, database applications, reporting and accounting servers, firewalls, call distributors (ACDs), load balancers, switches, etc. Descriptions and illustrations of such possible additional components are omitted here for clarity of the invention, but it should be understood that checkpoints can be extended to include some or all of such additional components. Moreover, while certain aspects of the invention relate to providing services to customers expressing interest in products or services, it may be possible that customers are initially contacted by agents 104 or other persons associated with the agency.

It should be still further noted that the term insurance agency should be construed broadly to include any type of business that provides insurance products as part of its business operations or as its entire business. Such a business can provide one type of insurance product (e.g. auto insurance) or it can include many types of insurance products (e.g. life, home, health, etc.), certain or all of which can be monitored using the principles of the invention. Still further, the agency can have one location, or it can be distributed over many locations, including offices and homes (e.g. for telecommuters). The agency can be associated with one carrier or many carriers. Finally, it is important to restate that the principles of the invention are not limited to insurance products, but can be extended to the provision of many types of goods and services through a centralized or distributed system of persons and systems.

The examples shown above and below are intended to be illustrative and should not be restrictive. It should be apparent to those skilled in the art that this solution can be easily generalized to include other checkpoints and business applications using alternate technologies.

Figure 2:
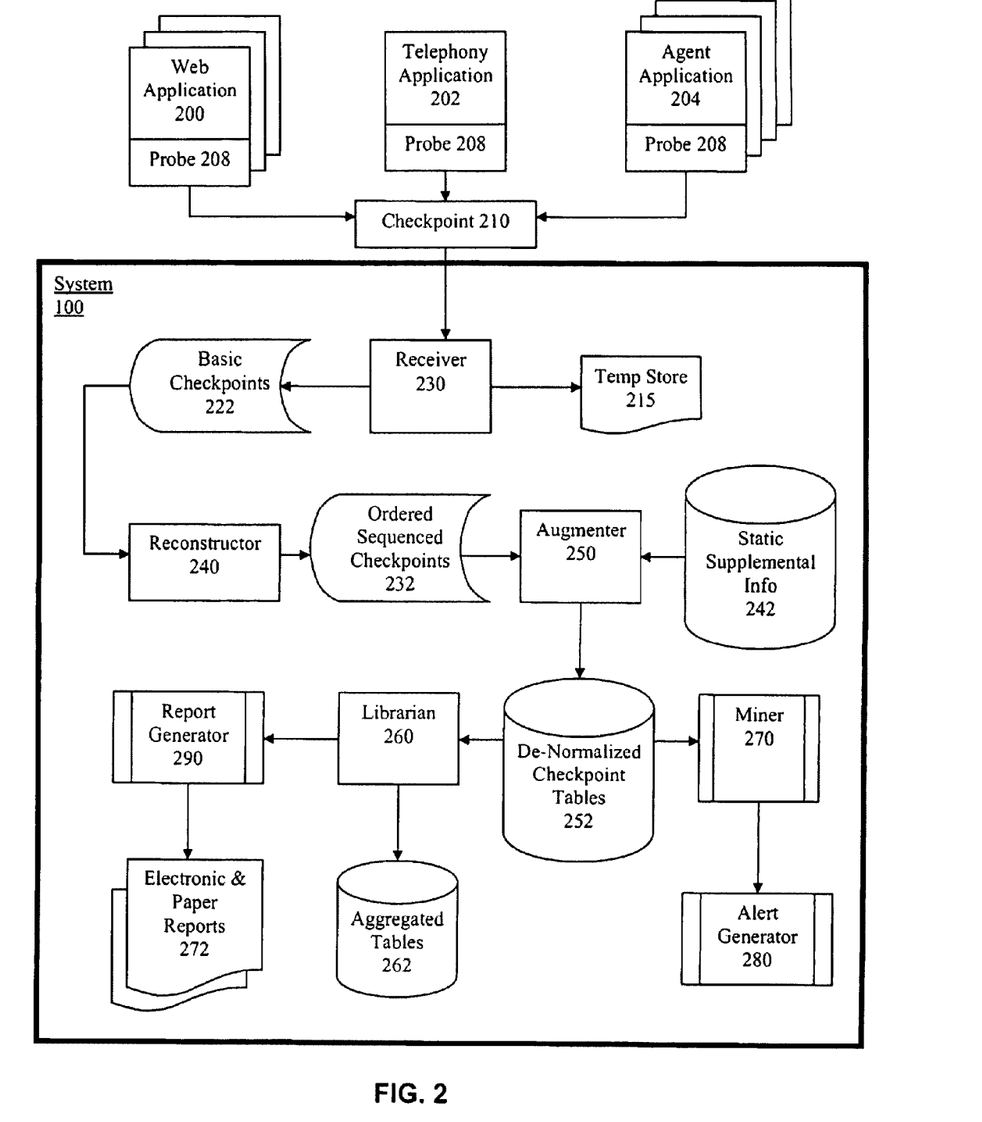
FIG. 2 is a functional block diagram illustrating example aspects of a system according to the invention.

An example system according to certain aspects of the invention is shown in alternative detail in FIG. 2. As shown, in general, events associated with providing a service to customers occur via a plurality of applications 200, 202, 204 running on heterogeneous platforms such as a web server, CTI or telephony system, desktop application, etc. Probes 208 provided with the applications send checkpoints 210 containing information related to these events to system 100, which in this example includes a receiver process 230 having a temporary store 215. Receiver 230 stores received checkpoints for further processing in store 222. System 100 further includes a reconstructor 240 which inspects, compares and re-orders checkpoints as necessary and stores the processed checkpoints in store 232. Augmenter 250 creates complete records from the processed checkpoints, possibly also using information from sources 242, and creates de-normalized tables 252. A miner 270 can review these tables for alert and other conditions, which when detected can be generated by an alert generator 280. A librarian 260 periodically retrieves records from tables 252 to create aggregated tables 262, and provide information for report generator 290, which can produce reports 272.

Applications 200, 202, 204 for use with the invention generally represent any program or process used during, or in support of, a customer transaction involving voice, text or other communications. According to an aspect of the invention, applications can be written in any language and executed on any type of hardware. For an insurance agency example, the applications 200 include web applications running a consumer web site, applications 202 include a telephony system and applications 206 comprise a collection of agent desktop tools. Accordingly, users 102 of the applications may include a self-directed consumer and a person calling into the call center, while users 104 typically include agents.

More particularly, web applications 200 provide functionality for allowing customers to interact with the agency via web pages and conventional user interface controls that can be accessed and served over a network such as the Internet. With reference to FIG. 1, these applications 200 can correspond to certain applications and functionality used by customers 102 and agency 110 (e.g. one or more of processes 112) when customers 102 access an insurance agency website via Internet 108. In one example implementation, web applications 200 can be C# web server applications provided on a Windows .NET Server and/or C#/.NET web services and other services communicating with a .NET Server using XML files.

Telephony applications 202 can include computer telephony (CTI) applications (e.g. Avaya CT) running on, or communicating with, a PBX/ACD call server such as a Definity G3 from Avaya. With reference to FIG. 1, these applications 202 can correspond to applications used by PBX/CTI 106 and agency 110 (e.g. one or more of processes 112) when customers 102 access an insurance agency via telephone (e.g. PSTN, VoIP, cell, etc.).

Agent applications 204 can be standalone Visual Basic applications running on a desktop, laptop, notebook computer such as a Windows or Mac computer. Such applications can have, or can communicate with, browser or network communication functionality for interacting with agency 110 via a network such as a LAN or the Internet. Alternatively, applications 204 can be implemented as web services (e.g. C# web services application) that are accessed by agents via a browser application such as Internet Explorer, either using only browser functionality or further using plug-in functionality, and via a web server (e.g. C# web application). Applications 204 can further include access control and other mechanisms such as those described in co-pending U.S. patent application Ser. No. 11/939,443, the contents of which are incorporated herein by reference. With reference to FIG. 1, these applications 204 can correspond to applications used by agents 104 and agency 110 (e.g. one or more of processes 112) when a customer 102 contacts agent 104 of an insurance agency via telephone (e.g. PSTN, VoIP, cell, etc.).

According to aspects of the invention, a checkpoint 210 is a software object used to hold information about activities or events of particular interest in connection with providing customer service. A checkpoint can be implemented in a variety of ways, but in one example implementation each checkpoint is an XML structure/file that can be extended to include any level of detailed information.

For the purpose of an insurance agency illustration, five types of checkpoints can be used. These include the following: Arrival—That point at which a person arrives at the agency either by visiting the web site or by calling a phone number; Quote Start—That point at which a person provides a piece of valid information (such as line of business or product of interest) to indicate intent to complete a quote interview and/or enough information is automatically gathered (e.g. the State corresponding to the area code from which the customer is dialing); Quote Presented—That point at which a person provides the last piece of information required in the interview and is presented with a quotation; Lead—That point at which a person indicates intent to purchase a product after providing additional information; Purchase—

That point at which a person completes the purchase process and is presented with the product.

In this example, each checkpoint 210 contains several data elements including, but not limited to, the following: ID—a unique identifier that includes a sequence number, a session number, a probe identifier, a checkpoint type and a timestamp; Type—i.e. Arrival, Quote Start, Quote Presented, Lead and Purchase; Timestamp—synchronized timestamp across all applications; Return Code—such as success or failure along with any information messages; Results—a subset of the information processed by the application including elements that may not have been returned to the requester; Geography—including state, county, city and zip code; Product—line of business (e.g., Auto, Home, Life, Health, Annuities) and sub-line of business (e.g., Classic Car, Motorcycle, Homeowners, Condo, Renters); Customer—such as name, account number, address, etc.; Performance—such as page response times and application response times for each server involved in handling the request.

A probe 208 can be implemented in many ways depending on the type of platform and application it is associated with. Typically, probe 208 is a process, application or set of code that communicates with the associated application 200, 202, 204 and/or executes on the same platform as the associated application 200, 202, 204. In one example where multiple checkpoints can be generated for a target application, there is a separate probe 208 associated with each different checkpoint type.

In one example implementation, where web applications 200 are C# web application and/or C#/.NET web services and other services, probes 208 are function calls and the like that are hardcoded into applications 200 at predefined points in processing corresponding to the checkpoint. For example, a function call for a Quote Presented checkpoint can be embedded along with code that causes a web page to be served to a customer that includes information for providing an insurance quote. The embedded code will package the checkpoint data, send it off to a collection procedure and then return control to the host application 200.

For an example implementation where telephony application 202 includes an Avaya CT CTI application running on, or communicating with, a PBX/ACD call server such as a Definity G3 from Avaya, it is not possible to embed code within the proprietary application. However, these systems include reporting functionality whose outputs can be externally accessed via a network directory, port or other means. Accordingly, probes 208 associated with this application are implemented as separate applications provided on separate connected computers that extract reports from the PBX/CTI or other call server and are configured to automatically parse through the data and determine when an event associated with a checkpoint has occurred. Such probe applications can further determine and extract additional information from the reports to complete information for the checkpoint in as much detail as possible.

In one example embodiment including an Avaya CMS reporting system, to gain access to the telephony call data (and to create the desired checkpoints) probe 208 is implemented as a process that monitors a directory that is used by the Avaya system to dump call records to be imported into the Avaya call management system (CMS). Whenever a file appears probe 208 grabs a copy of that file, parses through the data and creates the desired checkpoints. Probe 208 can further include a CTI application that interacts with the phone system in real time. Certain events of interest (together with the action taken by the agent through the use of the desktop application) trigger the creation of checkpoints. These probe 208 applications can further communicate with system 100 to complete the sending of the checkpoint.

For an example implementation where agent applications 204 are standalone Visual Basic applications running on a Windows or Mac computer, probes 208 are preferably implemented as additional Visual Basic function calls inserted in the overall program at processing points corresponding to the checkpoints 210. For example, when an agent first begins to enter information in fields for the purpose of obtaining an insurance quote, a function call can be inserted at the associated program point where this information is used to build a quote request. This function call can create a Quote Start checkpoint.

In the illustrated insurance agency example, the web applications 200 and the agent applications 204 include all five types of probes (one for each above-described checkpoint types), while the telephony application 202 will include only one probe (for the arrival checkpoint). However, for simple product purchases it may be possible that a consumer could perform the entire transaction using touch tone or voice recognition capabilities, in which case application 202 could support more types of probes. In general, a probe 208 collects pertinent information, creates a checkpoint 210 and sends the checkpoint to a receiver service 230. For example, a probe can measure the time required to handle a request and any portion of that request that was distributed across any other server. This information can be stored as the performance characteristics of the checkpoint. In some implementations, probe 208 maintains a cache of checkpoints so that it can respond to requests to resend specific checkpoints.

Receiver 230 can be implemented as a C# web service application that receives the request from a probe 208 to store a checkpoint 210. It preferably responds to such requests immediately as to avoid interfering with the performance of the sending application 200, 202, 204. As such this service will likely be provided in a load balanced configuration. Receiver 230 has responsibility for ensuring that each checkpoint is written to the database 222. In case the database is not currently available, the receiver preferably caches the requests in temporary storage 215 and writes them when the database becomes available.

Reconstructor service 240, also typically implemented as a C# web service application, detects when checkpoints are written to database 222 and performs processing to ensure that checkpoints are properly ordered and sequenced, and to store them in database 232. An example implementation of reconstructor 240 will be provided in more detail below.

Augmenter service 250 reorganizes the checkpoints (typically represented as XML structures) into de-normalized relational tables, (typically represented as database structures) in database 252. Accordingly, stores 222 and 232 are typically implemented as collections of XML files, while database 252 is implemented as a SQL database and associated server such as a Microsoft SQL Server. Augmenter service 250 can also supplement information contained in checkpoints with information contained in other tables 242 or in later checkpoints.

Supplemental info 242 represents additional information that the augmenter service can obtain or derive in order to augment checkpoint information. A few possible examples of the supplemental data that can be obtained and/or generated by service 250 are listed below:

Database Fields—The augmenter creates individual fields for frequently accessed data elements. These fields can then be included in any database indexes for improved performance.

De-normalize Fields—A checkpoint may contain only an identifier of the agent who handled the call. The augmenter pulls in additional details from an agent table including the agent name, manager name, hire date, qualifications, etc.

Inferences—The line of business of an arrival checkpoint could be determined directly as the results of a deep link to a specific line of business or indirectly by the line of business of the first quote presented checkpoint within that session.

Session Stitching—After identifying a unique consumer (by methods such as detecting a return visitor logging into the same account, cookie detection, agent customer selection or any host of other methods), the augmenter stitches together the individual sessions into a super-session that can be used by reporting services to consider the entire customer experience.

For example, using the types of checkpoints described above in connection with one possible application in an insurance call center, the augmenter can correlate checkpoints so as to provide a detailed account from when a customer first arrived at the call center, started a quote for an insurance product, was presented a quote, began providing information needed to apply for an insurance product, and finally purchased a product. Advantageously, the entire transaction can be analyzed from beginning to end, even when heterogeneous systems and processes are used, and even if the customer interacts with the call center at different times and using different means.

Those skilled in the art will understand how to implement the functionality of service 250 based on the above descriptions, and will further recognize that many variations and additional types of augmentation are possible.

The miner service 270 reads through the checkpoint table 252 and applies heuristics to determine events of special interest. When it finds a situation that is out of bounds (e.g., consistently slow return times from a specific server, increased arrivals from a specific group or no quotes from a specific carrier) it raises a corresponding alert 280. Any number of standard rules-based systems, regular expression evaluators or hand-crafted code with a sequence of conditional statements could be used to mine through the data. In one embodiment including a Microsoft SQL server, miner 270 is implemented as a Transact SQL stored procedure.

Alert generator service 280 catches any raised alert conditions, identifies the proper handling procedure and executes the steps in that procedure. The action taken could include sending a single e-mail, page, text message or other media to the production monitoring team, sending out a series of escalation notifications or instructing a piece of hardware to take action (e.g., instruct the load balancer to take a specific machine out of service for new requests). Any number of systems could be used to handle the exceptions (including interfaces to a sophisticated production monitoring system such as IBM's Tivoli). In one example embodiment, the actions are embedded into the stored procedure or make call outs to operating system scripts.

Librarian service 260 organizes the checkpoint tables to ensure fast access for the most frequently used information. For example, it may keep small tables with the results for the past 5-7 days for monitoring day-to-day activities. Furthermore, it may keep another set of tables for the data collected in the past 90 days for trending analysis. Finally, it may further keep full or aggregated results by month, quarter or year for historical reporting. Temporal horizontal partitioning can be used on the tables (collections of denormalized checkpoints) to create the short-term (5-7 day), mid term (past 90 day) or long term tables. These aggregated tables are stored in database 262.

The librarian service also controls access to the data and presents only that data that is relevant to the specific requester 290. For example, a marketing representative managing a specific campaign may be only allowed to view data for that customer segment while a finance representative may be allowed to view data on all customers and create electronic and paper reports 272.

Figure 3:
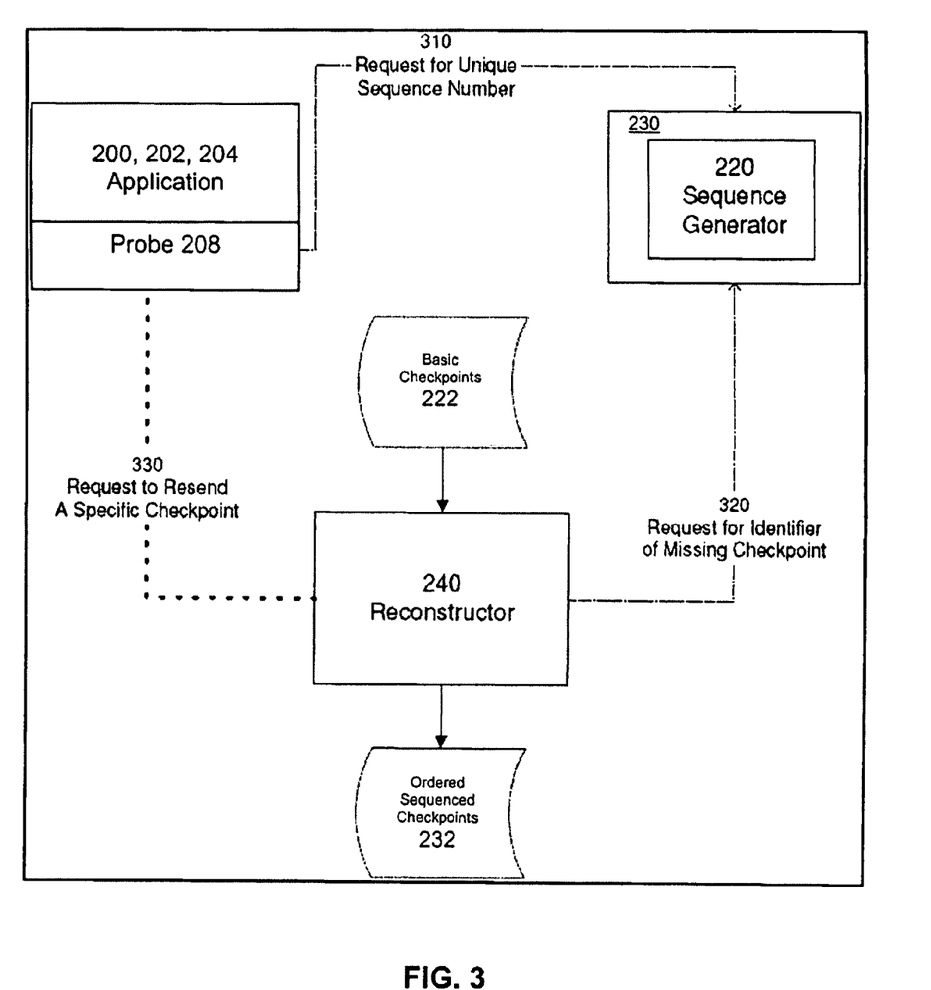
FIG. 3 is a functional block diagram further illustrating example aspects of checkpoint creation and reconstruction according to principles of the invention.

An example process of creating and sequencing checkpoints that can be implemented by system 100 is illustrated in more detail in FIG. 3. As depicted in FIG. 3, receiver 230 includes a sequence generator 220. Probe 208 obtains the unique identifier of the checkpoint from the sequence generator 220, for example by making a request 310 (e.g. predefined XML files that are communicated over a public or private network via a network protocol such as HTTPS). This request 310 also has the side-effect of registering the checkpoint event, thus allowing the reconstructor service 240 to place checkpoints in the proper sequence, to request another copy of a missing checkpoint 330 or to recreate a checkpoint if necessary.

Figure 4:
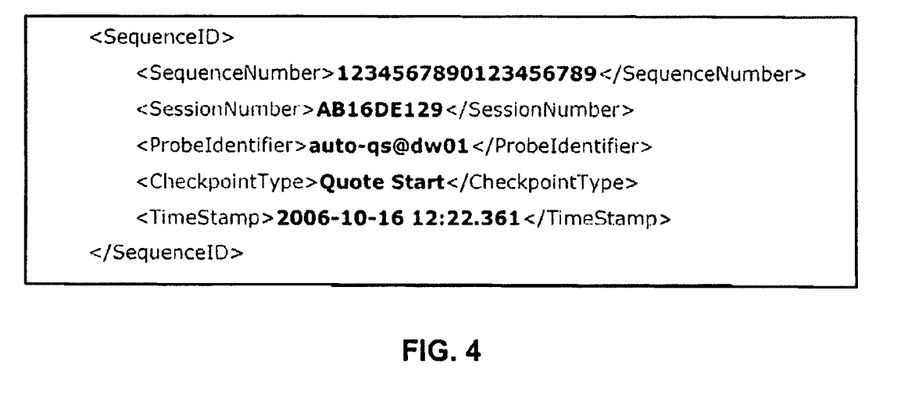
FIG. 4 illustrates an example checkpoint identifier according to aspects of the invention.

Sequence generator 220 generates unique identifiers for each checkpoint. In one example, an identifier contains a unique sequence number, a session number, a probe identifier, a checkpoint type and a timestamp. A sample sequence identifier is shown FIG. 4.

As depicted in FIG. 3, if a checkpoint is missing from a sequence, the reconstructor 240 will retrieve the missing sequence identifier 320 and issue a request 330 to the originating probe 208 to resend the checkpoint (e.g. using predefined XML files communicated over a public or private network via a network protocol such as HTTPS). If a checkpoint can not be located, the reconstructor creates one with the information contained in prior and subsequent checkpoints. For example, in order to reach a quote presented stage one must pass through the quote started stage. If necessary, a quote started checkpoint can be recreated by using the geography information from the quote presented checkpoint and the timestamp from the sequence generator or from estimating a timestamp based on statistical analysis of the times between the preceding arrival checkpoint and the subsequent quote presented checkpoint.

Figure 5:
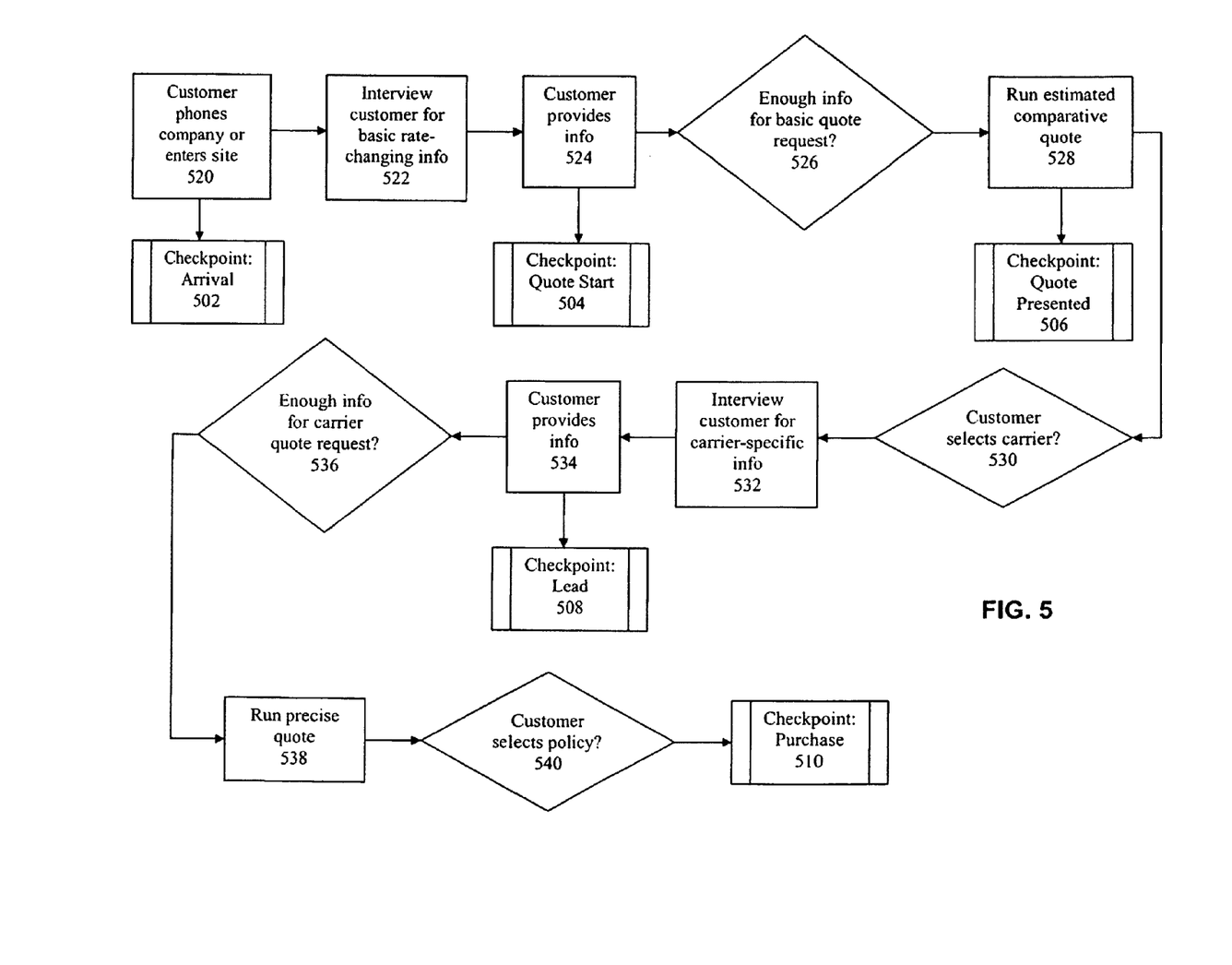
FIG. 5 illustrates examples of checkpoint collection in an end-to-end insurance product quote process according to aspects of the invention.

An example implementation of the principles of the invention in an insurance agency call center will be described in more detail in connection with FIG. 5, which illustrates an example of an end-to-end process of providing an automobile insurance product to a customer. This can include a quote progression as is described in U.S. patent application Ser. No. 11/936,598, now abandoned, the contents of which are incorporated herein by reference. It should be noted that the steps shown in FIG. 5 are not necessarily performed at the same time or in one communication session, or even necessarily in the sequence shown. For example, a particular customer session may start at any point in the overall process, information from that session can be saved, and the customer's information can be retrieved when the customer returns. Various other alternatives are possible.

As shown in FIG. 5, in a first quote process step 520, the first checkpoint 502 (i.e. Arrival) is created when a customer initiates contact with the insurance agency, for example by phoning a telephone number associated with the agency (and/or keying numbers through an IVR to select an insurance product) or visiting a website and/or dedicated quote information web page provided by the agency. Accordingly, different probes associated with different applications (e.g. applications 200, 202, 204) may detect this event and create this checkpoint.

Preferably, some minimal information is provided by the customer or inferred from session information to uniquely identify the customer and used to create the checkpoint. For example, in a CTI example, the customer's phone number is generally available from CLID info and can be used. In a web example, a cookie with a return visitor identifier may be used as a method to identify a customer, or the customer may be prompted to provide a phone number and/or user or logon ID.

Next, in a step 522 the customer is interviewed for basic information that can be used to generate an estimated comparative quote. This information typically includes geographic information (e.g. zip code), driver information, driver information (e.g. age, sex, etc.), driving record, vehicle information, and basic insurance coverage levels (e.g. liability limits, deductibles, etc.).

In a next quote process step 524, the customer begins providing the requested information. In a web example, the customer can provide this information directly via fields in a web page. In a phone example, an agent talking with the customer can similarly enter this information via fields in a desktop application, or some or all of the information can be entered by the customer via an IVR system. In any event, this is detected by the corresponding probe and used to create a second checkpoint 504 (i.e. Quote Started).

As the customer provides information, the agent and/or web applications can build a quote request for the customer, and when sufficient information is included in the request as indicated in step 526, this condition can be detected to determine when to run an estimated comparative quote. This operation, when performed in step 528, is used to generate a third checkpoint 506 (i.e. Quote Presented). In one example implementation, the comparative quote includes estimated quotes for several carriers for auto insurance policies based on the basic information provided by the customer. This can be done in many ways, for example as described in more detail in co-pending application Ser. No. 11,936,598.

In a next step 530, the customer is provided the opportunity to select a carrier associated with one or more of the estimated quotes. If the customer selects a carrier, a set of carrier-specific questions can be asked beginning in step 532. Once the customer begins providing answers to such questions in step 534, a fourth checkpoint 508 (i.e. Lead) is generated.

After all the information the carrier needs for a specific quote request is received, as detected in step 536, a precise quote is requested in step 538, and the details are provided to the customer. If the customer agrees to purchase the policy, for example by providing payment information, as detected in step 540, a fifth and final checkpoint 510 (i.e. Purchase) is generated.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method of analyzing a same transaction that is supported by a plurality of different processes, comprising:
embedding probes in the plurality of different processes, wherein the plurality of different processes are respectively running on one or more computers;
providing a service that is adapted to communicate with the embedded probes;
automatically detecting, by the embedded probes, events related to how the corresponding processes work to handle the same transaction; and
automatically collecting checkpoint data corresponding to the detected events and including information relating to handling of the same transaction at the service.

2. A method according to claim 1, further comprising:
reconstructing the checkpoint data into an ordered time sequence.

3. A method according to claim 1, further comprising:
augmenting the checkpoint data with supplemental information; and
aligning the checkpoint data, including any augmented data, in de-normalized tables.

4. A method according to claim 1, further comprising:
mining the checkpoint data for alert conditions.

5. A method according to claim 1, wherein the processes include:
a first process supporting a first customer interaction associated with the transaction; and
a second different process supporting a second different customer interaction associated with the transaction.

6. A method according to claim 5, wherein the first and second customer interactions occur at different times.

7. A method according to claim 5, wherein the first and second customer interactions occur using different communication technologies.

8. A method according to claim 7, wherein the different communication technologies include two or more of a web application, a telephony application and an agent application.

9. A method according to claim 1, wherein the plurality of different processes include at least a first process supporting a website accessible over the public Internet and a second process supporting a PSTN telephony application.

10. A method according to claim 1, wherein the transaction is a financial services product purchase.

11. A system for analyzing a same transaction that is supported by a plurality of different processes, comprising:
embedded probes in the plurality of different processes, the probes being adapted to automatically detect events related to how the corresponding processes work to handle the same transaction, wherein the plurality of different processes are respectively running on one or more computers;
a service that is adapted to communicate with the embedded probes, and to thereby automatically collect checkpoint data corresponding to the detected events and including information relating to handling of the same transaction.

12. A system according to claim 11, wherein the service includes a reconstructor adapted to arrange the collected checkpoint data into an ordered time sequence.

13. A system according to claim 11, wherein the service includes:
an augmenter adapted to supplement the checkpoint data with supplemental information, and align the checkpoint data, including any augmented data; and
de-normalized tables for storing the aligned checkpoint data.

14. A system according to claim 11, wherein the service includes a miner adapted to analyze the checkpoint data for alert conditions.

15. A system according to claim 11, wherein the processes include:
a first process supporting a first customer interaction associated with the transaction; and
a second different process supporting a second different customer interaction associated with the transaction.

16. A system according to claim 15, wherein the first and second customer interactions occur at different times.

17. A system according to claim 15, wherein the first and second customer interactions occur using different communication technologies.

18. A system according to claim 17, wherein the different communication technologies include two or more of a web application, a telephony application and an agent application.

19. A system according to claim 11, wherein the plurality of different processes include at least a first process supporting a website accessible over the public Internet and a second process supporting a PSTN telephony application.

20. A system according to claim 11, wherein the transaction is a financial services product purchase.

21. A system according to claim 11, wherein the embedded probes comprise native code included together with other native code associated with the processes.

22. A method of analyzing a same purchase of a financial services product, comprising:
   identifying a plurality of different processes used to support interactions with a customer associated with the same purchase;
   embedding probes in the identified plurality of different processes, wherein the plurality of different processes are respectively running on one or more computers;
   respectively associating a type of checkpoint with each of the embedded probes, each type corresponding to a different stage of the purchase;
   providing a service that is adapted to communicate with the embedded probes;
   automatically detecting, by the embedded probes, events related how the corresponding processes work to handle to the same purchase;
   automatically collecting checkpoint data corresponding to the detected events and including information relating to handling of the same purchase at the service; and
   determining how and when the different stages of the purchase were fully or partially completed using the collected checkpoint data.

23. A method according to claim 22, wherein the processes include:
   a first process supporting a first customer interaction associated with the purchase; and
   a second different process supporting a second different customer interaction associated with the purchase.

24. A method according to claim 23, wherein the first and second customer interactions occur using different communication technologies.

25. A method according to claim 24, wherein the different communication technologies include two or more of a web application, a telephony application and an agent application.

* * * * *